United States Patent
Jiang

(10) Patent No.: US 7,664,059 B2
(45) Date of Patent: Feb. 16, 2010

(54) ERROR HANDLING IN A WIRELESS COMMUNICATIONS SYSTEM

(75) Inventor: Sam Shiaw-Shiang Jiang, Taipei (TW)

(73) Assignee: Innovative Sonic Limited, Tortola (VG)

( * ) Notice: Subject to any disclaimer, the term of this patent is extended or adjusted under 35 U.S.C. 154(b) by 227 days.

(21) Appl. No.: 11/278,546

(22) Filed: Apr. 4, 2006

(65) Prior Publication Data
US 2006/0221853 A1 Oct. 5, 2006

Related U.S. Application Data

(60) Provisional application No. 60/594,415, filed on Apr. 5, 2005.

(51) Int. Cl.
*H04B 1/44* (2006.01)
(52) U.S. Cl. ............................ 370/282; 714/798
(58) Field of Classification Search .............. 455/115.1; 709/230; 714/776
See application file for complete search history.

(56) References Cited

U.S. PATENT DOCUMENTS

| | | | |
|---|---|---|---|
| 6,483,855 B1 * | 11/2002 | Minagawa ............... | 370/493 |
| 2003/0147396 A1 | 8/2003 | Jiang | |
| 2004/0187068 A1 * | 9/2004 | Chintada et al. ........... | 714/776 |
| 2004/0206160 A1 | 10/2004 | Gupta | |
| 2004/0208160 A1 * | 10/2004 | Petrovic et al. ............ | 370/350 |
| 2006/0067238 A1 * | 3/2006 | Olsson et al. .............. | 370/242 |

FOREIGN PATENT DOCUMENTS

| | | |
|---|---|---|
| CN | 1581731 A | 2/2005 |
| EP | 1 361 707 A2 | 11/2003 |
| EP | 1 361 707 A3 | 11/2003 |
| EP | 1 507 365 A2 | 8/2004 |
| EP | 1 465 369 A1 | 10/2004 |
| EP | 1 507 365 A2 | 2/2005 |
| JP | 2002-516527 | 6/2002 |
| WO | WO 99/60761 | 11/1999 |

OTHER PUBLICATIONS

Universal Mobile Telecommunication System(UMTS);Radio Link Control (RLC) protocol specification ETSI TS 125 322 V4.100 Date Sep. 2003, p. 14-16,42-44,54 Sections 4 2 1 3 9 4 and 101 ETSI, France XP014016803; ISSN 000-0001.
3GPP TS 25.322 V6.3.0 (Mar. 2005), "Radio Link Control (RLC) Protocol Specification".

* cited by examiner

*Primary Examiner*—Rafael Pérez-Gutiérrez
*Assistant Examiner*—Marcos Batista
(74) *Attorney, Agent, or Firm*—Winston Hsu

(57) ABSTRACT

A method for detecting an erroneous sequence number in a status report in a wireless communications system includes receiving a status report sent from a receiver of the wireless communications system, detecting whether a negatively acknowledged sequence number is within a range that is larger than or equal to the sequence number following the sequence number of the last in-sequence acknowledged packet and smaller than the sequence number of the next packet to be transmitted for the first time, and detecting that the status report includes an erroneous sequence number when a negatively acknowledged sequence number is not within the abovementioned range.

8 Claims, 3 Drawing Sheets

ERROR HANDLING IN A WIRELESS COMMUNICATIONS SYSTEM

CROSS REFERENCE TO RELATED APPLICATIONS

This application claims the benefit of U.S. Provisional Application No. 60/594,415, filed Apr. 5, 2005, and included herein by reference.

BACKGROUND OF THE INVENTION

1. Field of the Invention

The present invention is a method and a device of detecting an erroneous sequence number in a status report unit in a wireless communications system, in particular a method of effectively detecting a status report unit comprising the erroneous sequence number and activating a reset mechanism at an appropriate time, and a device implementing the method.

2. Description of the Prior Art

With the coming of the information age, requirements of mobile voice, data communications, and various mobile services increase each day. Communications systems of prior art are facing bottlenecks of channel usage overflowing and inefficient transmission speeds. Therefore, the third generation mobile communication was developed to have better usage of the frequency spectrum and higher-speed transmission service. Compared to the existing second generation mobile communication technology, the most significant difference with the third generation mobile communication is that the third generation mobile communication uses a Wideband Code Division Multiple Access (WCDMA) protocol for wireless access. The WCDMA protocol provides a more efficient channel usage, outstanding coverage, and high quality, high-speed multimedia data transmission. The WCDMA protocol can satisfy different service requirements of QoS, provide flexible duplex transmission services, and also better communication quality.

Taking a specification set by the $3^{rd}$ Generation Partnership Project (3GPP), the $3^{rd}$ generation mobile communications system can provide different levels of transmission quality and operates in different modes according to the different requirements, for instance, Transparent Mode (TM), Unacknowledged Mode (UM), Acknowledged Mode (AM). TM is used for services requiring instant transmission, UM is used for services requiring instant transmission as well as packet orders, and AM is used for robust services requiring data accuracy but not instant transmission.

In AM, for better data accuracy and robustness, Radio Link Control (RLC) layers of a transmitter and a receiver initiate a status report procedure at an appropriate time to have the receiver transmit a status report unit, or a piggybacked status report unit to the transmitter. The transmitter then executes procedures followed according to the status report unit from the receiver.

For more efficient transmission, under the AM, the transmitter defines status variables below:

1. Variable VT(S): represents a Sequence Number (SN) of a next Protocol Data Unit (PDU) to be transmitted for a first time (i.e. excluding retransmitted PDUs). The variable is updated after corresponding PDUs are transmitted. An initial value of the variable is 0.

2. Variable VT(A): represents an SN of a next expected acknowledged PDU, meaning the SN following an SN of a last in-sequence acknowledged PDU. The variable is updated after a status report unit showing the expected PDU had been positively acknowledged.

According to the variables VT(S) and VT(A), the RLC layer is able to detect whether an SN in a status report unit is correct. Please see the description below.

With the specification defined by the 3GPP, in AM, an SN of a PDU is represented by 12 bits. If a status report unit (or a piggybacked status report unit) comprises an erroneous SN, meaning when a negatively acknowledged SN in the status report unit (or the piggybacked status report unit) does not agree with $VT(A) \leq SN \leq VT(S)-1$, an RLC reset procedure will be initiated to recover the error. Comparisons between SNs are done by modulus operations with VT(A) as a modulus base. With the base=VT(A) and a negatively acknowledged SN x, determination is made whether x lies outside an interval $\{x|(VT(A)-base) \mod 4096 \leq (x-base) \mod 4096 \leq (VT(S)-1-base) \mod 4096\}$, in order to detect whether any erroneous SN is contained in the status report unit.

For example, in AM, suppose that a transmitter has transmitted PDUs with SN=0 to SN=249 (inclusive) and the PDUs with SN=0 to SN=199 (inclusive) are positively acknowledged. From definitions of the status variables, it is known that VT(A)=200, and VT(S)=250. Assuming a protocol error occurs and makes a status report unit received by a receiver show a PDU with SN=300 is negatively acknowledged when in fact, the transmitter may have not yet transmitted the PDU with SN=300. Now with a modulus base=200, check if $\{x|(VT(A)-base) \mod 4096 \leq (x-base) \mod 4096 \leq (VT(S)-1-base) \mod 4096\}$ $=\{x|(200-200) \mod 4096 \leq (x-200) \mod 4096 \leq (250-1-200) \mod 4096\}$ $=\{x|0 \leq (x-200) \mod 4096 \leq 49\}$ Since the SN=300 is not inside a set $\{x|0 \leq (x-200) \mod 4096 \leq 49\}$, the status report unit transmitted from a receiver comprising an erroneous SN is detected. Thereafter, the RLC layer initiates a reset procedure to recover this kind of error.

From the above descriptions of the prior art, when a negatively acknowledged SN of a status report unit and the SN lies outside a set $\{x|(VT(A)-base) \mod 4096 \leq (x-base) \mod 4096 \leq (VT(S)-1-base) \mod 4096\}$, the prior art is able to detect an erroneous SN in the status report unit. However, when VT(A)=VT(S), meaning an SN of a next PDU to be transmitted for a first time equals an SN of a next expected acknowledged PDU, problems will occur in the above detection method.

For example, in AM, suppose that a transmitter has transmitted PDUs with SN=0 to SN=199 (inclusive) and the PDUs are all positively acknowledged. From definitions of the status variables, it is known that VT(A)=VT(S)=200. Assuming a protocol error occurs and makes a status report unit received by a receiver show a PDU with SN=300 is negatively acknowledged when in fact, the transmitter may have not yet transmitted the PDU with SN=300. Now with a modulus base=200, check if $\{x|(VT(A)-base) \mod 4096 \leq (x-base) \mod 4096 \leq (VT(S)-1-base) \mod 4096\}$ $=\{x|(200-200) \mod 4096 \leq (x-200) \mod 4096 \leq (200-1-200) \mod 4096\}$ $=\{x|0 \leq (x-200) \mod 4096 \leq 4095\}$.

Since the SN=300 lies inside a set $\{x|0 \leq (x-200) \mod 4096 \leq 4095\}$, the prior art is unable to determine whether the status report unit comprises an erroneous SN, so an RLC reset procedure cannot be initiated. This leads to errors not being recovered and waste in wireless transmission resources.

To summarize, when an SN of a next PDU to be transmitted for a first time equals an SN of a next expected acknowledged PDU, which means that all PDUs transmitted by a transmitter are positively acknowledged, any negative acknowledgement of a PDU in a status report unit must be caused by a protocol error. However, the prior art is unable to detect errors as such, which leads to not initiating a reset procedure instantly, and causes waste in wireless resources.

SUMMARY OF THE INVENTION

According to the claimed invention, a method of detecting an erroneous sequence number of a status report unit in a wireless communications system includes receiving a status report unit output from a receiver of the wireless communications system. Whether the received status report includes a negatively acknowledged sequence that number lies in a range of greater than or equal to a sequence number following a sequence number of a last in-sequence acknowledged packet of a transmitter and less than a sequence number of a next packet to be transmitted for the first time by the transmitter is detected. Determination that the status report unit includes an erroneous sequence number is made when the negatively acknowledged sequence number is not in the range.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
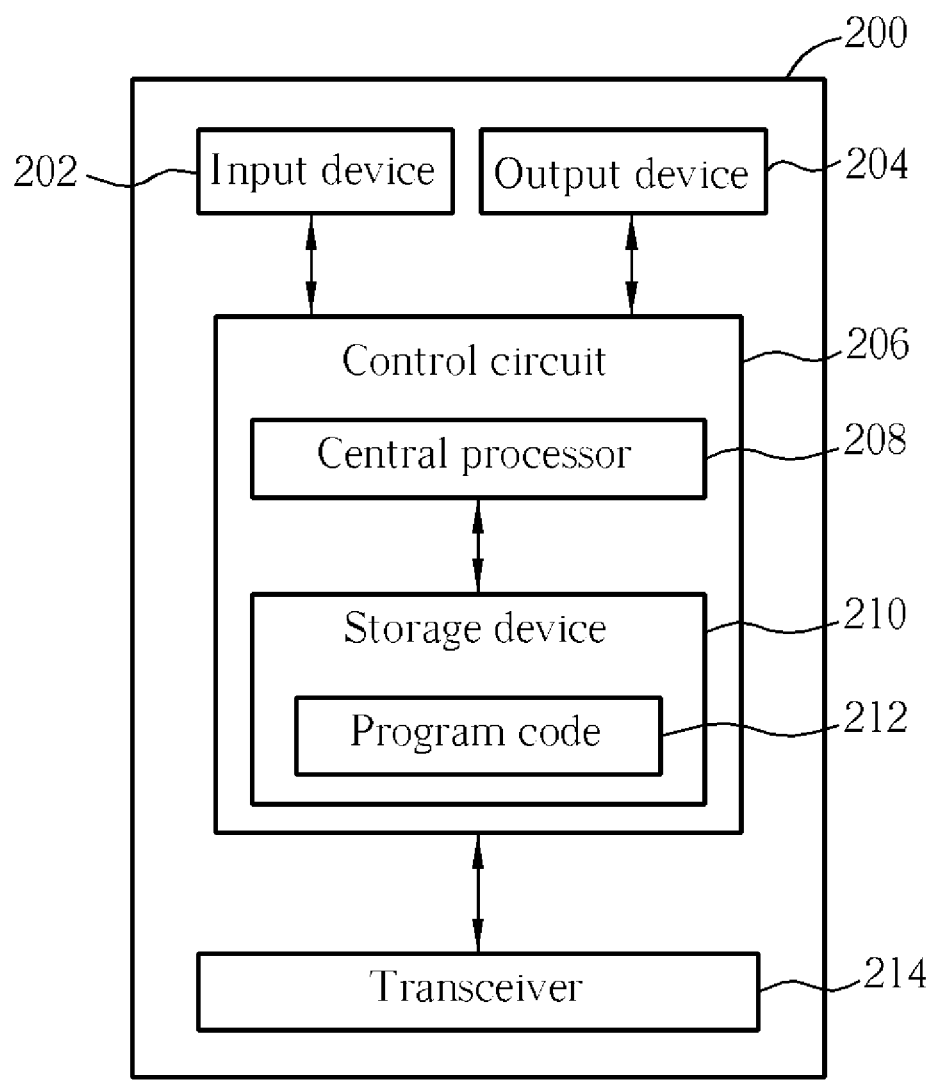
FIG. 2 is a block diagram of a wireless communication transmission device.

Please refer to FIG. 2. FIG. 2 is a block diagram of a wireless communications transmission device (transmitter) 200 used in a wireless communications system. For clarity, FIG. 2 only shows an input device 202, an output device 204, a control circuit 206, a central processor 208, a storage device 210, a program code 212, and a transceiver 214 of the wireless communications transmission device 200. In the wireless communications transmission device 200, the control circuit 206 executes the program code 212 stored in the storage device 210 with the central processor 208, and then controls operations of the wireless communication transmission device 200. The wireless communications transmission device 200 can receive signals input by users through the input device 202, or output signals through the output device 204. The transceiver 214 is used for receiving or transmitting wireless signals. In a structure of a communications protocol, the transceiver 214 is known as a part of a first layer, whereas the control circuit 206 is an application of a second and a third layer.

Figure 3:
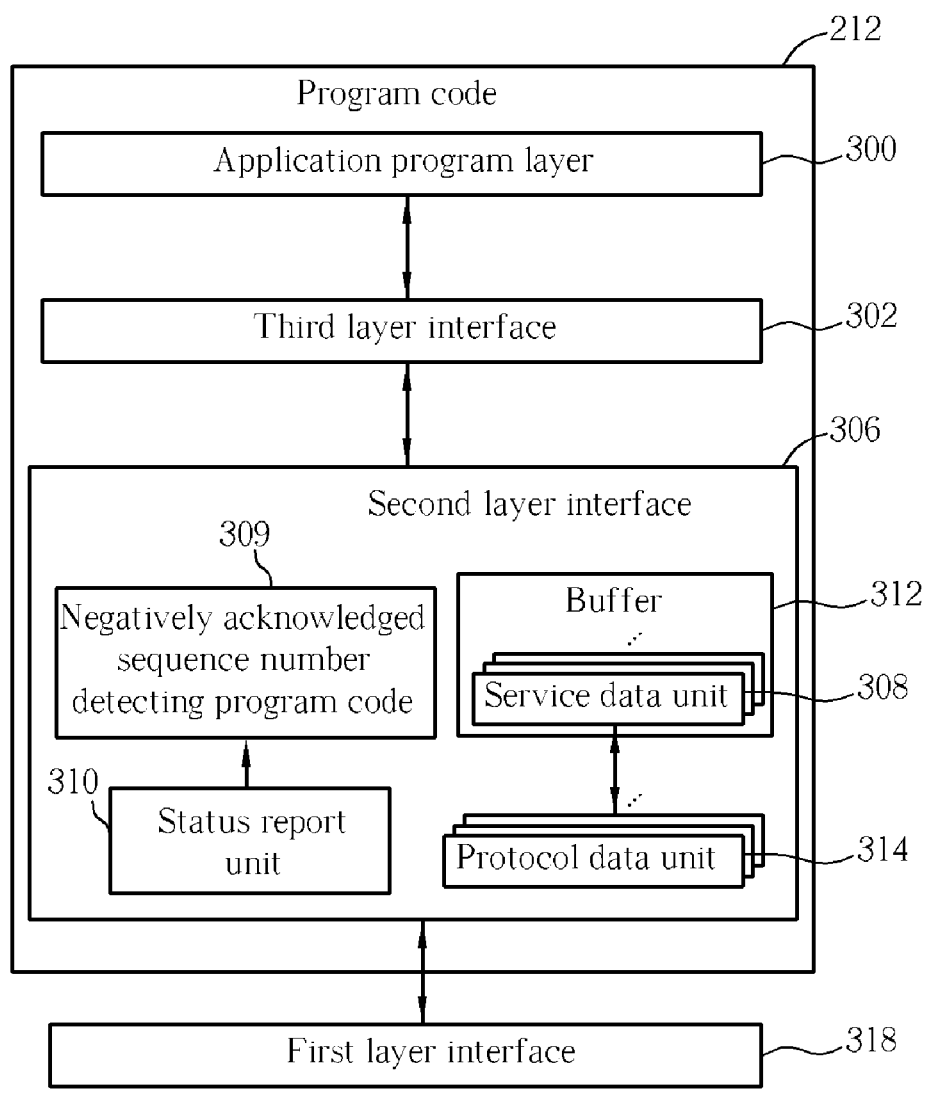
FIG. 3 is a diagram of the program code in FIG. 2.

Please refer to FIG. 3. FIG. 3 is a schematic diagram of the program code 212 in FIG. 2. The program code 212 comprises an application program layer 300, a third layer interface 302, a second layer interface 306, and a first layer interface 318. When transmitting signals, the second layer interface 306 stores a plurality of Service Data Units (SDUs) 308, which are submitted from the third layer interface 302, in a buffer 312. Then, the second layer interface 306 generates a plurality of Protocol Data Units (PDUs) 314 according to the SDUs 308 stored in the buffer 312, and outputs the PDUs 314 generated to a destination through the first layer interface 318.

For improving robustness of data transmission, when in AM, the program code 212 receives a status report unit 310 or a piggybacked status report unit 310 of a receiver from the first layer interface 308, in order to detect a receiving status of the receiver. Under this situation, the present invention provides a negatively acknowledged SN detecting program code 309 for detecting whether the status report unit comprises an erroneous SN.

Figure 1:
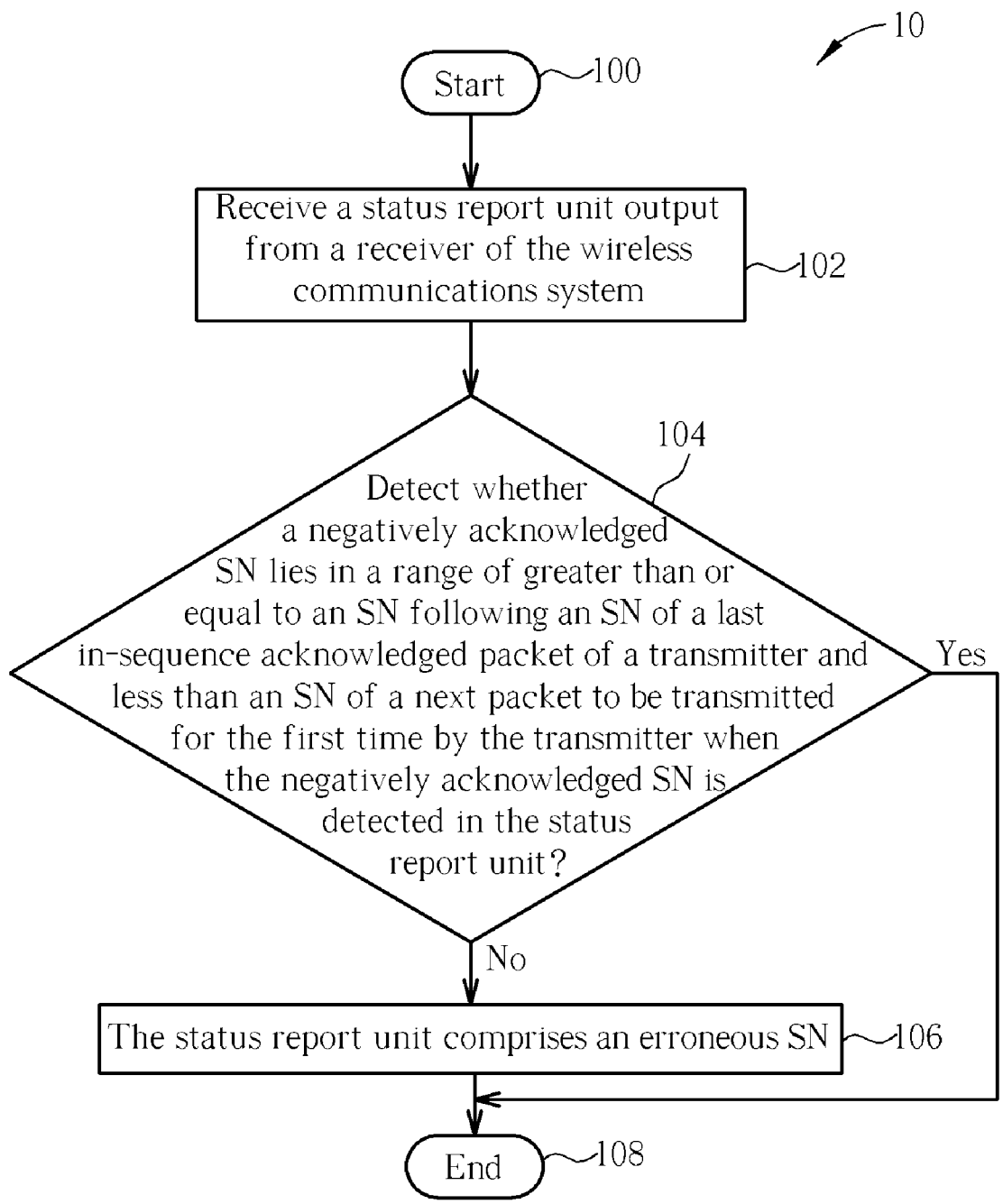
FIG. 1 is a flow chart of detecting whether a status report unit comprises an erroneous SN in a wireless communications system.

Please refer to FIG. 1. FIG. 1 is a flow chart of a procedure 10 that detects whether a status report unit comprises an erroneous SN in a wireless communications system. The wireless communications system can be a $3^{rd}$ generation mobile communications system operating in AM. The procedure 10 can be complied into the negatively acknowledged SN detecting program code 309, and the procedure 10 comprises:

Step 100: start.

Step 102: receive a status report unit output from a receiver of the wireless communications system.

Step 104: detect whether a negatively acknowledged SN lies in a range of greater than or equal to an SN following an SN of a last in-sequence acknowledged packet of a transmitter and less than an SN of a next packet to be transmitted for the first time by the transmitter when the negatively acknowledged SN is detected in the status report unit. If the negatively acknowledged SN does not lie in the range, go to step 106; otherwise, go to step 108.

Step 106: the status report unit comprises an erroneous SN.

Step 108: end.

In accordance to the procedure 10, when a status report unit shows a negatively acknowledged SN, the present invention detects whether the negatively acknowledged SN lies in a range of greater than or equal to an SN following an SN of a last in-sequence acknowledged packet of a transmitter and less than an SN of a next packet to be transmitted for the first time by the transmitter, meaning to detect whether the negatively acknowledged SN agrees with $VT(A) \leq SN < VT(S)$. The status report unit is determined to comprise an erroneous SN when disagreement occurs. Furthermore, a reset procedure is initiated when the status report unit is determined to comprise an erroneous SN. As the equation $VT(A) \leq SN < VT(S)$ shows, a modulus operation with $VT(A)$ as a modulus base, meaning that base=$VT(A)$, is used to detect whether the SN x lies outside the set $\{x|(VT(A)-base) \bmod 4096 \leq (x-base) \bmod 4096 < (VT(S)-base) \bmod 4096\}$ and hence detect whether the status report unit comprises an erroneous SN.

For example, in AM, suppose that a transmitter has transmitted PDUs with SN=0 to SN=249 (inclusive) and the PDUs with SN=0 to SN=199 (inclusive) are positively acknowledged. From definitions of the status variables, it is known that $VT(A)=200$ and $VT(S)=250$. Assuming a protocol error occurs and makes a status report unit received by a receiver show a PDU with SN=300 is negatively acknowledged when in fact, the transmitter may have not yet transmitted the PDU with SN=300. Now with a modulus base=200, check if $\{x|(VT(A)-base) \bmod 4096 \leq (x-base) \bmod 4096 < (VT(S)-base) \bmod 4096\}$
$= \{x|(200-200) \bmod 4096 \leq (x-200) \bmod 4096 < (250-200) \bmod 4096\}$
$= \{x|0 \leq (x-200) \bmod 4096 < 50\}$.

Since the SN=300 lies outside a set $\{x|0 \leq (x-200) \bmod 4096 < 50\}$, the status report unit is detected as comprising an erroneous SN. The RLC layer then initiates a reset procedure to recover from the error.

In addition, when $VT(A)=VT(S)$, meaning an SN of a next PDU to be transmitted for a first time equals an SN of a next expected acknowledged PDU, the present invention also can effectively detect a status report unit comprising an erroneous SN.

For example, in AM, suppose that a transmitter has transmitted PDUs with SN=0 to SN=199 (inclusive) and the PDUs are all positively acknowledged. From definitions of the status variables, it is known that VT(A)=VT(S)=200. Assuming a protocol error occurs and makes a status report unit received by a receiver show a PDU with SN=300 is negatively acknowledged when in fact, the transmitter may have not yet transmitted the PDU with SN=300. Now with a modulus base=200, check if {x|(VT(A)−base) mod 4096≦(x−base) mod 4096<(VT(S)−base) mod 4096}

={x|(200−200) mod 4096≦(x−200) mod 4096<(200−200) mod 4096}

={x|0≦(x−200) mod 4096<0}.

Since the SN=300 lies outside a set {x|0≦(x−200) mod 4096<0}, therefore the status report unit comprising an erroneous SN is detected. The RLC layer then initiates a reset procedure.

As described before, when an SN of a next PDU to be transmitted for a first time equals an SN of a next expected acknowledged PDU, it represents all PDUs having been transmitted by a transmitter are positively acknowledged. So, any negative acknowledgement by a status report unit must be an error caused by a protocol. The prior art cannot detect protocol errors in this case. In comparison to the present invention in the same situation, with VT(A)≦SN<VT(S), it is known that none of the negatively acknowledged SNs agree with VT(A)≦SN<VT(S) when VT(A)=VT(S). In fact, there should not be any negatively acknowledged PDUs reported from a status report unit, and if there is, it must be a protocol error. So the present invention is able to detect this kind of error with VT(A)≦SN<VT(S).

When applying the procedure 10 of the present invention, as known by people who are familiar in this field that designers can write (burn-in) the procedures 10 into a storage device (firmware) of a communication device as a program code. There are many modifications or variations of design that can be made while retaining essence of the present invention.

In summary, when an SN of a next PDU to be transmitted for a first time equals an SN of a next expected acknowledged PDU, all PDUs transmitted by a transmitter are positively acknowledged. Therefore, any negative acknowledgement by a status report unit must be an error caused by a protocol. The present invention can effectively detect this kind of error and initiate an RLC reset procedure at an appropriate time, avoiding waste in system resources, and hence increase transmission efficiency and save system resources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of detecting an erroneous sequence number of a status report unit in a wireless communications system, the method comprising:
   receiving a status report unit output from a receiver of the wireless communications system;
   detecting whether a negatively acknowledged sequence number lies in a range of greater than or equal to a sequence number following a sequence number of a last in-sequence acknowledged packet of a transmitter and less than a sequence number of a next packet to be transmitted for the first time by the transmitter when the negatively acknowledged sequence number is detected in the status report unit; and
   detecting that the status report unit comprises an erroneous sequence number when the negatively acknowledged sequence number is not in the range.

2. The method of claim 1 further comprising initiating a reset procedure when the status report unit comprises the erroneous sequence number.

3. The method of claim 1 wherein detecting whether the negatively acknowledged sequence number lies in the range of greater than or equal to the sequence number following the sequence number of the last in-sequence acknowledged packet of the transmitter and less than the sequence number of the next packet to be transmitted for the first time by the transmitter when the negatively acknowledged sequence number is detected in the status report unit is performed by modulus operation with the sequence number following the sequence number of the last in-sequence acknowledged packet of the transmitter as a modulus base.

4. The method of claim 1 wherein the status report unit is a piggybacked status report unit.

5. The method of claim 1 wherein the wireless communications system is a third generation mobile communications system.

6. The method of claim 5 wherein the third generation mobile communications system is operating in an acknowledged mode.

7. A wireless device comprising a central processing unit in electrical communications with a memory, the memory comprising program code for implementing the method of claim 1.

8. The method of claim 1 wherein it is determined that the status report unit comprises an erroneous sequence number when the negatively acknowledged sequence number is not in the range of greater than or equal to the sequence number following the sequence number of the last in-sequence acknowledged packet of the transmitter and less than and not equal to the sequence number of the next packet to be transmitted for the first time by the transmitter when the negatively acknowledged sequence number is detected in the status report unit.

* * * * *